Figure 8:
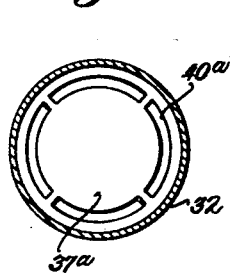

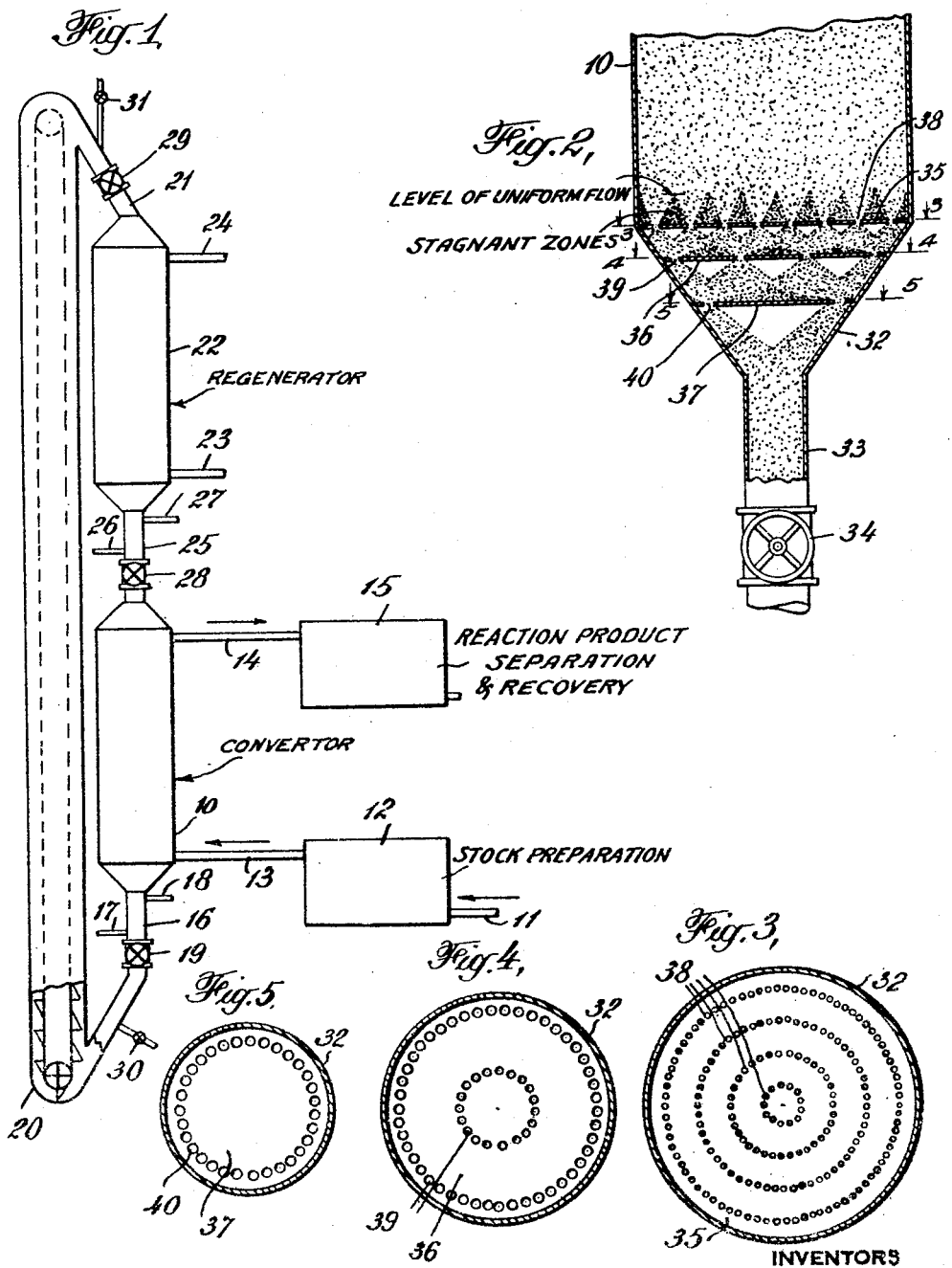

Dec. 3, 1946.  L. P. EVANS ET AL  2,412,136
METHOD AND APPARATUS FOR HYDROCARBON CONVERSION
Filed Jan. 28, 1943  3 Sheets-Sheet 2

Inventors
LOUIS P. EVANS
FREDERICK E. RAY

By Myron J. Burkhard
Attorney

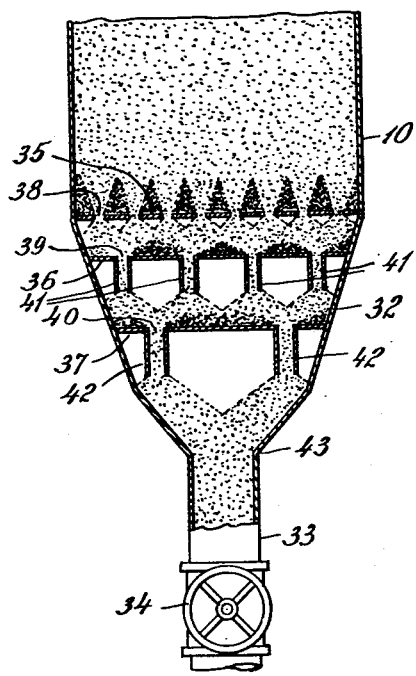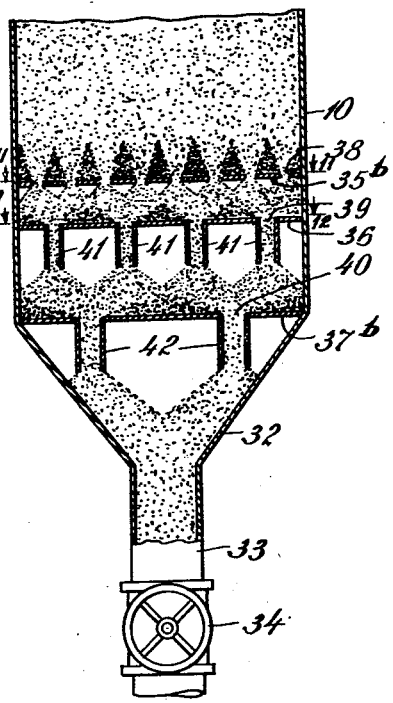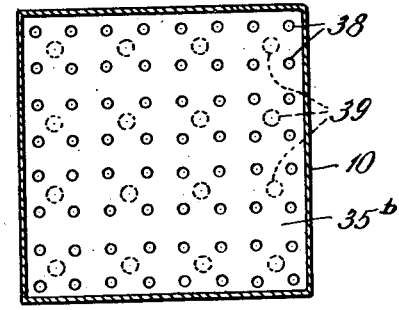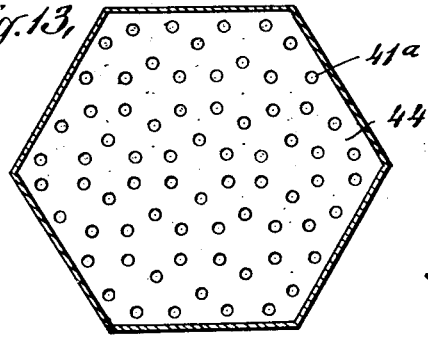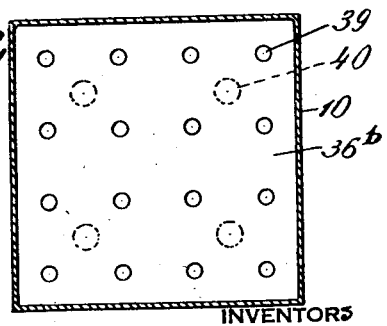

Patented Dec. 3, 1946

2,412,136

UNITED STATES PATENT OFFICE 2,412,136

METHOD AND APPARATUS FOR HYDROCARBON CONVERSION

Louis P. Evans, Woodbury, and Frederick E. Ray, Mantua, N. J., assignors to Socony-Vacuum Oil Company, Incorporated, a corporation of New York Application January 28, 1943, Serial No. 473,861

24 Claims. (Cl. 196—52)

This invention has to do with methods and apparatus for the conversion of hydrocarbon materials and is particularly concerned with processes such as those wherein a hydrocarbon to be converted is contacted in vapor form with a solid contact mass material capable of effecting or of influencing the desired conversion.

As is well known at this time, hydrocarbon materials may be cracked by being contacted at appropriate temperatures in contact with a particle form solid contact mass of catalytic material such as a clay, either natural or synthetic, various associations of alumina and silica either natural or synthetic, alumina, silica or any of a number of similar materials possessing adsorbent properties. Other reactions such as hydrogenation, dehydrogenation, alkylation, isomerization, and various other reactions may be similarly carried out, and in many of these cases the solid adsorbent material will contain or act as a carrier for an added material such as a metallic oxide capable of effecting the desired reaction. Typical of all of these reactions is the reaction of cracking a high boiling point hydrocarbon material to material of the nature of gasoline. While the cracking conversion of hydrocarbons will be utilized herein in describing the process, it is to be understood that the invention is not limited thereto.

Many operations of this general class have been carried out in equipment wherein the particle-form solid contact material is deposited as a fixed bed, alternately subjected to reaction and to regeneration. More recently processes have been proposed wherein a particle-form solid contact mass material catalytic in nature to the desired reaction, as described above, is moved in the form of a flowing stream through a reaction zone wherein the desired reaction is accomplished and then through a regeneration zone wherein residual products of the reaction which have been deposited upon the contact mass material, usually in the form of a combustible carbonaceous substance, broadly designated by the term coke, are removed, usually by combustion, to regenerate the contact mass material, after which the contact mass material is returned to the reaction zone. This invention is specifically directed to process and apparatus for the conduct of such processes wherein flowing particle form solid contact mass material is used.

It has for its principal object the provision of method and apparatus wherein a complete and uniform utilization of all the portions of the flowing stream of contact mass material may be attained in both the reaction zone and the regeneration zone.

It has for another principal object the provision of withdrawal means to be utilized in such zones whereby uniform withdrawal across the entire area of the flowing stream of contact mass material may be effected to provide uniform passage of such material through all portions of the flowing stream.

The successful operation of processes involving continuous flow of particle-form solid material through reaction vessels as in the cracking and regeneration steps of the continuous conversion process outlined above, requires that the flowing of the particle-form solid material be uniform throughout the reaction zones of these vessels. When granular material is discharged from the base of a vessel through an outlet of relatively small size as compared with the vessel, the velocity of flow will vary widely across a horizontal cross-section of the vessel and will be greatest directly above the outlet. This difference in velocity decreases at higher levels in the vessel, but equal velocity and even flow is never obtained in a large vessel if its cross-sectional area is much greater than that of the outlet. Previous methods have involved the use of grates or multiple ports individually regulated in an attempt to achieve even flow of particle form material in large vessels. Grates present mechanical difficulties and are particularly undesirable on pressure vessels as they do not in themselves provide means whereby escape of reaction vapors from the vessel with solid material may be avoided and by their nature render the provision of such means a difficult and complicated problem. The individual and concurrent control of multiple ports is too complicated for practical manual control and automatic regulators prove expensive and troublesome under high temperature operating conditions.

This invention avoids these difficulties by providing a simple and efficient method whereby the combined problems of uniform flow, uniform discharge and prevention of reactant escape are accomplished through the aplication of relatively simple principles of operation and items of equipment.

The invention may be understood by reference to the drawings attached to this specification. In these drawings Figure 1 is a highly diagrammatic showing of the entire setup used for accomplishing the conversion. Figure 2 is a vertical cross-section of one form of the apparatus.

Figure 7:
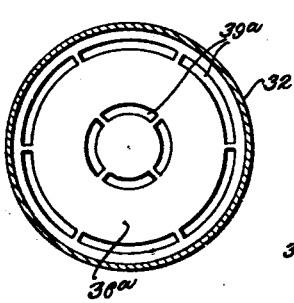
Figure 6:
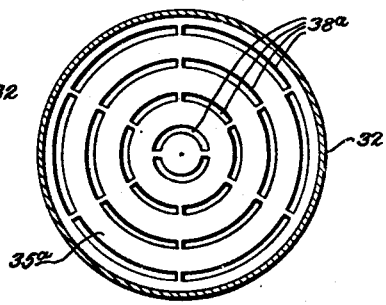
Figure 14:
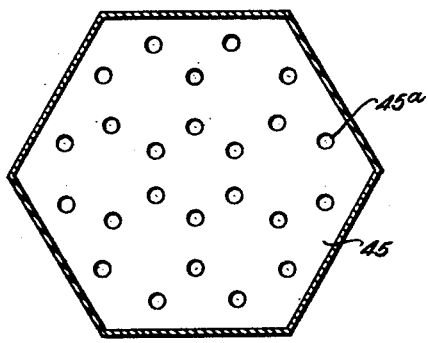
Figure 15:
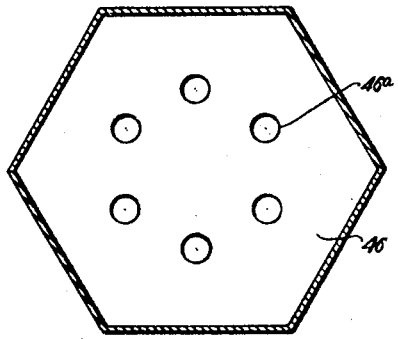
Figure 16:
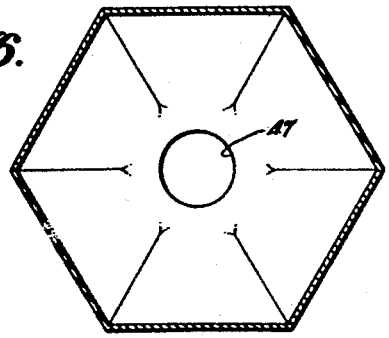

Figure 3 is a view in section taken on line 3—3 of Figure 2. Figure 4 is a view in section taken on line 4—4 of Figure 2. Figure 5 is a view in section taken on line 5—5 of Figure 2. Figures 6, 7, and 8 are views in section similar respectively to Figures 3, 4 and 5, but illustrating modified orifice configurations. Figure 9 is a view in vertical section similar to Figure 2 but illustrating a modified type of reaction chamber. Figure 10 is a view in vertical section similar to Figure 9 but involving a reaction chamber which is rectangular in cross section. Figure 11 is a view in section taken along the line 11—11 of Figure 10, illustrating the uppermost baffle plate in full lines and the baffle plate immediately therebelow in broken lines. Figure 12 is a view in section taken along the line 12—12 of Figure 10 illustrating the intermediate baffle plate in full lines and the lowermost baffle plate in broken lines. Figures 13, 14, 15 and 16 are cross sectional views taken in a reactor of hexagonal configuration, illustrating the baffle plates at the various levels therein beginning with Figure 13 at the highest level and continuing downwardly in numerical order.

Turning now to Figure 1. This figure shows in highly diagrammatic form a setup of apparatus in which the invention may be practiced. This apparatus consists of a reaction chamber 10 through which there is moved as a moving column a flowing stream of particle-form solid contact mass material. Hydrocarbons to be reacted, supplied to the system through pipe 11 are subjected to the charging stock preparation step indicated at 12, and from 12 flow through pipe 13 into reactor 10. The charging stock preparation step will in general consist in the main of heating the hydrocarbon charging stock to provide it in vapor form and at reaction temperature for entry to the reaction zone. The heating equipment used may be any of the usual forms of apparatus suitable for this purpose and will usually and preferably include a pipe still form of heater. The stock preparation step, it is also understood, may contain, if necessary, provision for separating from the material flowing through pipe 11 any portion which is not suitable for charge to reactor 10. For example, if a crude oil were charged through 11 and it was desired to pass only gas oil through pipe 13, the stock preparation step would include appropriate fractionating equipment, evaporators, vapor heaters, if necessary, and similar equipment capable of segregating from the charge only that desired portion to be converted and bringing it to the proper temperature for reaction while rejecting other portions of the original charge from the system. Reaction products from reactor 10 will be withdrawn through pipe 14 and passed to appropriate equipment for segregating and recovering products of reaction as indicated at 15. This equipment will normally be comprised of the usual setup of fractionators, gas separators, stabilizers, gas recovery systems and the like, as indicated by the necessities of the conversion in hand and will normally include provision for returning unconverted material or even other reaction products to the reactor for retreatment with or without prior passage through a stock preparation step.

It will be understood that heat exchangers and similar heat recovery arrangements may be applied at any point where necessary or appropriate.

Particle-form solid contact mass flowing from reactor 10 and contaminated by the reaction contained therein, is preferably passed through a purge section 16, wherein by means of a purge medium introduced at 17 and removed at 18, it may be freed of reactants. Passing through a valve 19, or any similar device, capable of controlling the rate of passage of solid material, which device, if desired, may be so designed as to assist in the proper isolation of the reaction zone from other portions of the system, the solid material passes into elevator 20. It is therein hoisted and discharged at 21 into the top of regenerator 22, to pass therethrough as a moving column. The regeneration is usually a combustion and to effect it, regeneration medium may be introduced at 23 and withdrawn at 24. Below regenerator 22, there is another purge section 25, purge medium being supplied at 26 and withdrawn at 27, in which regeneration medium may be removed to substantially prevent its presence in reaction chamber 10. Between this purge chamber 25 and reaction chamber 10, there may be provided a valve or other device 28 for the purpose of controlling solid flow, which also may assist in the isolation of the reactor or may be arranged to permit of carrying a pressure in the reactor different from that in other portions of the system. Similarly, if desired, a valve or other device 29 may be provided for complete control of similar functions within the regenerator. If necessary, catalyst may be withdrawn from the system as, for example, at 30, or may be added, as, for example at 31, and it is also to be understood that proper provision, if desirable, may be made for the removal of fines from the catalyst circulation system, for holding the external catalyst circulation system under pressure or vacuum or under a blanketing inert gas, and similar provisions.

The reaction carried out in reactor 10 in Figure 1 and the regeneration carried out in regenerator 22 are alike in that they comprise a contacting of a moving particle form solid with a fluid gasiform reactant. As pointed out before, it is advisable and even necessary that uniform contact of reactant and solid be secured and to this end at the bottom of both the regenerator and the reactor, there have been provided structures as discussed in the following figures:

Turning to Figure 2, there is shown here the construction adopted at the bottom of reactor 10. While for convenience in description, only the construction of reactor 10 is discussed, it must be remembered that the problem of uniform downward flow of solid material is the same within the regenerator 22 as it is within the reactor 10 and consequently in all of the following discussion, it must be understood that the description and the remarks made are equally applicable to the regenerator as well as to the reactor.

In Figure 2 we find reactor 10 terminating in a generally conically shaped neck 32 leading to a discharge pipe 33 upon which there may be mounted a valve or other control device 34 useful for any of the purposes or all of the purposes indicated for items 19 and 28 in the discussion of Figure 1. Within this conical neck 32, there are disposed several baffles 35, 36, and 37. The uppermost baffle 35 is so disposed as to constitute the bottom closure of reactor 10 and is provided with orifices 38. Baffles 36 and 37 are spaced apart and downwardly of 35, as will be explained. In these baffles and in closure 35, there are orifices, 38, 39, 40, so arranged that the single discharge stream in pipe 33 is fed by a plurality of streams originating in orifices 40, each of which in turn is fed from a plurality of orifices 39, and each of these in turn being fed by a plurality of orifices 38. The vertical spacing of baffles 35, 36 and 37 is such that the line defining a path of flow between any orifice in one baffle and an associated orifice in the baffle next above should not be less than about 45°. There may be any number of these baffles dependent upon the amount of subdivision of the single discharge stream 33 necessary to secure uniform flow over all of the cross-sectional area of reactor 10 at a level not substantially removed from the upper baffle 35. The total area of orifices in any baffle should be capable of adequately handling the maximum contact mass flow rate. The arrangement of orifices in these baffles should be such that for any orifice in a lower baffle, there are orifices properly disposed above it to provide a proper subdivision of solid material streams. The whole setup is one such that a large number of comparatively small individual streams equal in size are drawn from points symmetrically and evenly spaced throughout the area of reactor 10 and these streams are then stepwise and symmetrically combined and recombined until a single discharge stream is achieved. Thus we find that any control effective by control mechanism 34 upon the rate of flow of solid material is not reflected as a distortion of the equal flow of material through any portion of reactor 10 beginning at a level a relatively short distance above the uppermost baffle.

While Figures 3, 4 and 5 illustrate respectively, the baffles 35, 36 and 37, each with its orifices 38, 39 and 40, respectively, arranged in concentric rings, it is also possible to substitute annular slots in lieu of the punched or drilled holes and such a modification is illustrated in Figures 6, 7 and 8. Note that slots 38a, 39a and 40a in baffles 35a, 36a and 37a correspond in number, position and relative size to the patterns defined respectively by orifices 38, 39 and 40.

In this form of construction, it is not easy to arrive readily at a single form of apparatus useful for widely varying flow characteristics of solid material, for example, the placement of orifices 40 or 40a with respect to orifices 39 or 39a respectively and of orifices 39 or 39a with respect to orifices 38 or 38a respectively will not necessarily be the same for solids of different sizes and frequently experimental adjustment must be made to achieve an equal flow distribution upon changing the type of solid being handled by the apparatus. It has been found possible to avoid this by providing for certain of the orifices vertical shields extending downwardly from the orifices a distance not less than twice the width of the orifice.

Turning to Figure 9, this may be readily understood. Here, as in Figure 2, we have the reactor 10 with its conical neck 32 and discharge pipe 33 and its baffles 35, 36 and 37. Baffle 35 may have its orifices constructed either as concentric slots or concentric rings of drilled holes, as illustrated in Figures 3 to 8 inclusive. Baffles 36 and 37 are preferably of the type provided with orifices 39 and 40 respectively, in the form of concentric rings of holes from each of which orifice there depends a short straight tube, designated 41 in the case of orifices 39 and 42 in the case of orifices 40. These tubes should be of a length not less than about twice their diameter. Since the line of flow is now from the outlet of a tube 41 or 42, to either an orifice 40 spaced below a tube 41 or a throat 43 spaced below a tube 42, the vertical spacing below baffles such as 36 and 37 must be increased over that shown in Figure 2 to provide for the added length of the tubes 41 and 42. It has been found that this construction, once installed, may be utilized with equal accuracy of flow conditions over a wide range of solid materials of widely varying flow characteristics.

Figure 10 shows a vertical section quite similar to Figure 9 and equivalent in function to that of Figure 2. This form of construction being the same as that of Figure 2, like portions are designated by like numerals, the only difference being that this construction is more readily adapted to a rectangular reaction vessel. The difference between the two figures arising from the fact that the necked down portion 32 between reactor 10 and pipe 33 begins at baffle 35 in Figure 9 and does not begin until baffle 37 in Figure 10 is to indicate that either form of construction may be used, except that in the case of Figure 9, directed to a circular reaction zone, the form there shown probably gives less dead space.

Figure 11 is a plan view of baffle 35b in Figure 10 showing how a group of orifices 38 are provided for and symmetrically related to each orifice 39 in the baffle 36b which is next below, the position of which orifices 39 is indicated in Figure 11 by dotted circles. Figure 12 similarly shows a plan of baffle 36b showing how groups of orifices 39 are located symmetrically with respect to orifices 40 in baffle 37b next below, the position of which orifices 40 is indicated by dotted circles.

The method is not restricted to circular and rectangular reactors, but may be applied to a reactor of any cross-section. For example in Figures 13 to 16 inclusive, there are shown in diagram form each of several of the baffles which might be used at the bottom of a reactor of hexagonal cross-section. In these figures, 44 represents the uppermost baffle or reactor bottom closure and 45 and 46 the first and second baffles below it, the final discharge pipe being indicated at 47. Baffle plates 44, 45 and 46 are provided respectively with orifices 44a, 45a and 46a distributed so that the streams from 44a are combined and passed through orifices 45a whereupon they are again combined and passed through orifices 46a, finally merging to pass discharge pipe 47. It will be noted that the successive plates, considered in the direction of flow of the mass material, are provided with fewer holes of individually larger diameter.

It is also noted that the method is not restricted to reactors whose cross-sections are regular geometric figures, although the use of such reactors is quite unlikely for a number of reasons.

Nor is the uniformity of flow so established subject to cancellation by internal structures which may be installed in the reactor, such as, for example, reactant distributor grids, or heat removal structures, so long as those grids, or structures, themselves are designed with reasonable care for uniformity of flow therethrough.

We claim:

1. A method for the conversion of hydrocarbons in the presence of a moving particle-form solid contact mass material with substantially equal exposure of all portions of the contact mass comprising maintaining a downwardly moving column of said contact mass material, replenishing this column at the top thereof, introducing hydrocarbons at conversion conditions of temperature and pressure to said column, removing products of conversion therefrom, conducting particle form solid material from the bottom of said column in a plurality of streams from a plurality of points, said streams being of less total cross-sectional area than said column and the size and arrangement of said streams across the cross-sectional area of the bottom of said column being such as to provide substantially uniform stream cross-sectional area per unit of column cross-sectional area across the entire column bottom, flowing said streams on to the first of a series of accumulations of said solid material located below said column, similarly withdrawing from the bottom of each of said accumulations, serially, a smaller number of streams of said solid material, the streams from each accumulation being horizontally staggered proportionately as regards cross-sectional area with respect to the streams thereabove and finally reducing the number of streams to a symmetrically placed single discharge stream while maintaining continuity of solid material column from the bottom of said conversion zone column through said streams and accumulations to said discharge stream.

2. A method for the conversion of hydrocarbons in the presence of a moving particle-form solid contact mass material with substantially equal exposure of all portions of the contact mass comprising maintaining a downwardly moving column of said contact mass material, replenishing this column at the top thereof, introducing hydrocarbons at conversion conditions of temperature and pressure to said column, removing products of conversion therefrom, conducting particle form solid material from the bottom of said column in a plurality of substantially equal streams uniformly distributed with respect to the cross-sectional area of said column and of substantially less cross-sectional area and flowing said solid material into the first of a series of accumulations thereof located at spaced levels below said column, withdrawing said solid material from the bottom of each of said accumulations, serially, in a progressively smaller number of equal streams, the streams from each accumulation being horizontally symmetrically staggered with respect to the streams flowing onto said accumulation, finally merging the streams from the lowermost accumulation uniformly into a single discharge stream and throttling the flow of solid material in said discharge stream so as to maintain continuity of column therefrom upwardly through said streams and accumulations to said column of solid material thereabove.

3. A method for the conversion of fluid reactants in the presence of a moving particle-form solid contact mass material with substantially equal exposure of all portions of the contact mass comprising maintaining a downwardly moving column of said contact mass material, replenishing this column at the top thereof, introducing fluid reactants at conversion conditions of temperature and pressure to said column removing products of conversion therefrom, conducting particle form solid contact mass material from the bottom of said column to an accumulation of said solid material therebelow in a plurality of streams from a plurality of locations across said column cross-section, the streams being of less total cross-sectional area than said column and the size and arrangement of said streams across the bottom of said column being such as to provide substantially uniform stream cross-sectional area per unit of column cross-section entirely across the bottom of said column, withdrawing a smaller plurality of streams of said solid material from said accumulation, said smaller plurality of streams being horizontally staggered proportionately as regards area between said first named plurality of streams, proportionately combining said smaller plurality of streams to form a single moving discharge stream while maintaining continuity of solid material column from said discharge stream through said accumulation and streams to said column thereabove.

4. A method for the conversion of hydrocarbons in the presence of a moving particle-form solid contact mass material with substantially equal exposure of all portions of the contact mass comprising maintaining a downwardly moving column of said contact mass material, replenishing this column at the top thereof, introducing hydrocarbons at conversion conditions of temperature and pressure to said column, removing products of conversion therefrom, removing spent contact mass material from the bottom of said column in a plurality of small equal streams from a plurality of points substantially uniformly distributed with respect to the cross-sectional area of said column and flowing it onto a accumulation of said solid material below said column, similarly withdrawing a smaller number of equal streams from the bottom of said accumulation, the last named streams being horizontally symmetrically staggered with respect to the streams thereabove, combining said streams to form a single discharge stream, throttling the flow from said discharge stream to control the rate of solid material flow in said downwardly moving column, leading said discharge stream into a moving column of spent catalyst in a regenerator, passing regeneration medium through the contact mass column in said regenerator, removing regenerated contact mass from the bottom of said regenerator column in a plurality of small equal streams from a plurality of points substantially uniformly distributed with respect to the cross-section of said column and flowing it onto an accumulation of said solid material below said column, withdrawing a smaller number of equal streams from the bottom of said accumulation, the last named streams being horizontally staggered with respect to the streams thereabove, combining said streams to form a single discharge stream of regenerated contact mass material, throttling the flow of said discharge stream and returning said regenerated material substantially directly to said reaction column to form a substantial replenishment therefor.

5. In a reactor for the contacting of a fluid reactant with a moving particle-form solid contact mass material with substantially equal utilization of all portions of the contact mass, a means defining a vertically extending reaction zone within which there is confined a moving column of contact mass material, means to supply contact mass material thereto, means to supply reactant to said zone, means to remove reaction products from said zone, below said zone a series of chambers of substantially less height than said zone, transverse partitions between said chambers and between the uppermost chamber and said zone, a contact mass removal duct leading from the lowermost chamber, each of said partitions having a plurality of orifices distributed substantially uniformly across its surface, the orifices in each partition in descending order being lesser in number the orifices in any partition being symmetrically staggered with respect to the orifices in the partition next below, so that a plurality of small streams of contact mass material originating in orifices of the uppermost partition are successively combined into a smaller number of streams and finally into a single stream within said discharge duct.

6. In a reactor for the contacting of a fluid reactant with a moving particle-form solid contact mass material with substantially equal utilization of all portions of the contact mass, a means defining a vertically extending reaction zone within which there is confined a moving column of contact mass material, means to supply a contact mass material thereto, means to supply reactant to said zone, means to remove reaction products from said zone, below said zone a series of chambers of substantially less height than said zone, substantially flat transverse partitions between said chambers and between the uppermost chamber and said zone, a contact mass removal duct leading from the lowermost chamber, each of said partitions having a plurality of orifices distributed substantially uniformly across its surface, the orifices in each partition in descending order being lesser in number, the orifices in any partition being symmetrically staggered with respect to the orifices in the partition next below, so that a plurality of small streams of contact mass material originating in orifices of the uppermost partition are successively combined into larger streams and finally into a single stream within said discharge duct and on said discharge duct a flow control means to govern flow of contact mass material through said reaction zone.

7. A system for the conversion of hydrocarbons in the presence of a moving particle-form solid contact mass material comprising a means for defining a vertically extending reaction zone within which there is confined a moving column of contact mass material, means to replenish the contact mass material therein, means to bring hydrocarbon reactants to conversion conditions of temperature and pressure, means to introduce said hydrocarbon reactants into said column, means to remove reaction products therefrom, reaction product recovery and separation means, below said reaction zone a series of chambers of substantially less height than said reaction zone, substantially flat transverse partitions between said chambers and between the topmost chamber and said reaction zone, a contact mass removal duct leading from the lowermost chamber, each of said partitions having a plurality of orifices distributed uniformly across the surface thereof, the orifices in each partition in descending order being lesser in number, the orifices in any partition being symmetrically staggered with respect to the orifices in the partition next below so that a plurality of small streams of contact mass material originating in the orifices of the topmost partition are successively combined into a lesser number of streams and finally into a single stream in said discharge duct, means to define a vertically extending regeneration zone to which contact mass from said discharge duct is fed and in which there is confined a moving column of spent contact mass material undergoing regeneration, means to supply regeneration medium thereto, means to remove products of regeneration therefrom, means to effect substantially equal exposure of all contact mass therein to equal regeneration by withdrawing contact mass material from the bottom thereof in a plurality of substantially equal small streams from a plurality of points distributed substantially uniformly across the cross-section of said column, means to combine said streams into a single stream of regenerated contact mass material and means to return said regenerated contact mass material substantially directly to the said reaction as a substantial replenishment of the material therein.

8. A method of regenerating particle-form solid contact mass material comprising flowing said particle-form contact mass material downwardly through a reaction zone as a continuous moving column under regeneration conditions of temperature and pressure, replenishing the solid material in said column, introducing a regenerating medium into said column, removing products of regeneration therefrom, removing the particle-form solid from the bottom of said regeneration zone by subdividing the column into a plurality of components uniformly distributed over the cross-sectional area of the column and having a cumulative cross section less than that of the regeneration column, recombining said subdivisions in a plurality of horizontal stages, each recombination involving a reduction in the number of subdivisions and an increase in the cross-sectional area of each, and finally merging the subdivisions into a continuous moving bed constituting a discharge zone while maintaining continuity of solid material column from said discharge zone through said subdivisions to said column thereabove, all without division of any of said subdivisions during said recombining and merging.

9. A method for effecting the conversion of a fluid reactant in the presence of a particle-form solid contact mass material flowing as a moving bed through a reaction zone to a discharge zone of lesser cross-sectional area which comprises, introducing reactants into the reaction zone, withdrawing products of reaction from said reaction zone, adding particle form solid contact mass material to said reaction zone, flowing the material from the bottom of said reaction zone as a subdivided moving bed uniformly distributed over the cross-sectional area of said zone and having a cumulative cross-sectional area less than that of the reaction zone, recombining said subdivisions in a plurality of horizontal stages, each recombination involving a reduction in the number of subdivisions in the absence of any further division of the original subdivisions and finally merging the resulting subdivisions into a continuous moving discharge bed while maintaining continuity of solid material column from said discharge bed through said subdivisions to said reaction zone thereabove.

10. A method for effecting the conversion of a fluid reactant in the presence of a particle-form solid contact mass material flowing as a moving bed through a reaction zone to a discharge zone of lesser cross-sectional area which comprises, introducing reactants into the reaction zone, withdrawing products of reaction from said reaction zone, adding particle form solid contact mass material to said reaction zone, flowing the material from the bottom of said reaction zone as a subdivided moving bed uniformly distributed over the cross-sectional area of said zone and having a cumulative cross-sectional area less than that of the reaction zone, and without any further dividing of subdivisions recombining said subdivisions in a plurality of horizontal stages, each recombination involving a reduction in the number of subdivisions and an increase in the cross-sectional area of each subdivision, and finally merging the resulting subdivisions into a continuous moving compact discharge column and throttling the flow of solid material in said discharge column so as to maintain continuity of column therefrom upwardly through said subdivisions to said reaction zone thereabove.

11. A method for effecting the conversion of a fluid reactant in the presence of a particle-form solid contact mass material flowing as a moving bed through a reaction zone to a discharge zone of lesser cross-sectional area which comprises, introducing reactants into the reaction zone, withdrawing products of reaction from said reaction zone, adding particle-form solid contact mass material to said reaction zone, flowing the material from the bottom of said reaction zone as a subdivided moving bed uniformly distributed over the cross-sectional area of said zone and having a cumulative cross-sectional area less than that of the reaction zone, recombining said subdivisions in a plurality of horizontal stages, each recombination involving a reduction in the number of subdivisions and an increase in the cross-sectional area of each subdivision, effecting said recombination under resistance to flow conditions such that the resistance to flow effective at the level of initial subdivisions is equal per unit of cross-section at that level, merging the resulting subdivisions into a continuous moving discharge stream and throttling the flow in said discharge stream so as to control the rate of solid flow in said reaction zone.

12. Apparatus for the conversion of a reactant in the presence of a moving particle-form solid contact mass material with substantially equal exposure of all points of the contact mass comprising means defining a reaction zone, means to supply contact mass material thereto, means to supply reactants thereto, means to remove reaction products therefrom, a discharge duct of lesser cross section than said reaction chamber, flow throttling means on said discharge duct, means defining a connecting zone intermediate said reaction zone and said duct, a first plate partition defining the top of said connecting zone, at least one additional fixed partition spaced below the first one and lying parallel thereto within the connecting zone, said first partition having a plurality of uniformly distributed apertures therein and said other partition having a lesser number of apertures therein arranged in such staggered relation to the apertures in the first as to receive proportional solid flow therefrom.

13. Apparatus for the conversion of a reactant in the presence of a moving particle-form solid contact mass material with substantially equal exposure of all points of the contact mass comprising, means defining a vertically disposed reaction zone, means to supply contact mass material thereto, means to supply reactants thereto, means to remove reaction products therefrom, a discharge duct of lesser cross section than said reaction zone disposed therebelow, flow throttling means on said discharge duct means defining a connecting zone intermediate said reaction zone and said duct, a partition extending across the upper end of said intermediate zone defining the top of said intermediate zone, and a plurality of vertically spaced fixed partitions disposed therebelow in parallel relationship therewith and extending across said intermediate zone, each of said partitions lying within the intermediate zone and having a plurality of uniformly distributed apertures therein, the number of apertures in each partition successively increasing with distance upwardly from said duct, and being arranged in staggered relationship to receive material from a plurality of apertures thereabove.

14. Apparatus as claimed in claim 13 in which the cross section of the apertures in each partition decreases with distance of that plate upwardly from said duct.

15. In an apparatus for contacting gasiphase reactants with particle form solid contact mass material and with substantially equal exposure of all portions of the solid material: a vessel laterally confining a substantially compact bed of downwardly moving particle form solid contact mass material, means to admit gasiphase reactant to said vessel and means to withdraw gasiphase reaction products therefrom, means to introduce said solid material to the upper end of said vessel, a plurality of superposed, transversely extending partitions spaced apart in the lower section of said vessel, said partitions dividing the lower section of said vessel into a series of superimposed chambers of substantially less height than that portion of said vessel thereabove, the uppermost of said partitions having a plurality of holes therein, said holes being of such size and arrangement across said partition as to provide a substantially uniform aperture cross-sectional area per unit of partition cross-sectional area entirely across said partition and the total cross-sectional area of said holes being less than that of said vessel, and each of said succeeding partitions having a gradually decreasing number of holes therethrough, said latter holes in each of said succeeding partitions being horizontally staggered between the holes in the partition directly thereabove in such a manner as to receive proportionate flow of solid from said holes thereabove, a solid material discharge conduit connected to said vessel below the lowermost of said partitions, the inlet thereof being symmetrically placed with regards to said holes in said lowermost partition, flow control means on said conduit to govern the flow rate of solid material through said vessel.

16. In an apparatus for contacting gasiphase reactants with particle form solid contact mass material and with substantially equal exposure of all portions of the solid material: a vessel laterally confining a substantially compact bed of downwardly moving particle form solid contact mass material, means to admit gasiphase reactant to said vessel and means to withdraw gasiphase reaction products therefrom, means to introduce said solid material to the upper end of said vessel, a plurality of superposed, transversely extending partitions spaced apart in the lower section of said vessel, said partitions dividing the lower section of said vessel into a series of superimposed chambers of substantially less height than that portion of said vessel thereabove, the uppermost of said partitions having a plurality of equal orifices therein uniformly distributed across its cross-sectional area and each of said succeeding partitions below having a gradually decreasing number of larger orifices therethrough, said orifices in each of said succeeding partitions being horizontally proportionately staggered between the orifices in the partition directly thereabove, wherein the number and size of said orifices in said partitions are such that lines drawn from any given orifice in one partition to the orifices in the partition thereabove in horizontally adjacent positions have a slope greater than about 45 degrees, a solid material discharge conduit connected to said vessel below the lowermost of said partitions, the inlet thereof being symmetrically placed with regards to said orifices in said lowermost partition, flow throttling means on said conduit.

17. In an apparatus for contacting gasiphase reactants with particle form solid contact mass material and with substantially equal exposure of all portions of the solid material: a vessel laterally confining a substantially compact bed of downwardly moving particle form solid contact mass material, means to admit gasiphase reactant to said vessel and means to withdraw gasiphase reaction products therefrom, means to introduce said solid material to the upper end of said vessel, a plurality of superposed, transversely extending partitions spaced apart in the lower section of said vessel, said partitions dividing the lower section of said vessel into a series of superimposed chambers of substantially less height than that portion of said vessel thereabove, the uppermost of said partitions having a plurality of equal holes uniformly distributed across the cross-section thereof and each of said succeeding partitions below having a gradually decreasing number of equal holes of gradually increasing size, said holes in said succeeding partitions in each case being proportionately staggered between holes in the partition directly thereabove, conduits open at their ends dependently associated with each of the holes in said succeeding partitions, said conduits terminating substantially short of the partition below and being of length at least twice their diameter, a solid material discharge conduit connected to said vessel below the lowermost of said partitions, the inlet thereof being symmetrically placed with regards to said holes in said lowermost partition, flow throttling means on said conduit to control the rate of solid flow in said vessel.

18. A method for the conversion of gasiphase reactants in the presence of a moving particle form solid contact material with substantially equal exposure of all portions of the contact mass material to said reactants comprising: maintaining a substantially compact column of downwardly moving particle form contact material, continuously replenishing said column at the top thereof, passing gasiphase reactant through said column, continuously conducting contact material from the bottom of said column to an accumulation of contact material below in a plurality of streams from a plurality of locations, the streams being of less total cross-sectional area than said column and said streams being of such size and arrangement across the bottom of said column as to provide substantially uniform stream cross-sectional area per unit of column cross-section across the bottom of said column, withdrawing a smaller number of larger streams of said solid material from said accumulation, said last named streams being horizontally staggered between said first named streams so as to receive flow therefrom proportionate to their cross-sectional areas, combining said streams to form a single symmetrically placed discharge stream and throttling the flow in said discharge stream so as to maintain continuity of solid material column upwardly therefrom through said streams and accumulation to said column and so as to control the rate of solid flow in said column.

19. Apparatus for the conversion of a reactant in the presence of a moving particle-form solid contact mass material with substantially equal exposure of all points of the contact mass comprising: means defining a vertically disposed reaction zone, means to supply contact mass material thereto, means to remove reaction products therefrom, a discharge duct of lesser cross-section than said reaction zone disposed therebelow, throttling means on said discharge duct, means defining a connecting zone intermediate said reaction zone and said duct, a plate partition defining the top of said intermediate zone, and a plurality of vertically spaced fixed plate partitions disposed therebelow in parallel relationship therewith, each of said partitions lying within the intermediate zone and having a plurality of uniformly distributed apertures therein, the number of apertures in each partition successively increasing with distance upwardly from said duct, and being arranged in staggered relationship to receive material from a plurality of apertures thereabove, and for at least one of said partitions an equalizing tube depending from the defining edge of each aperture in registering position, said equalizing tubes being of a length at least twice their diameter.

20. An apparatus for conducting gas-solid contacting operations comprising a vessel laterally confining a substantially compact column of downwardly moving particle-form solid material, means to admit gas to said vessel and means to withdraw gas therefrom, means to introduce said solid material into the upper section of said vessel, a discharge conduit connected to the lower end of said vessel, flow throttling means associated with said discharge conduit, a plurality of superposed partitions extending across said vessel within its lower section above said discharge conduit dividing the lower section of said vessel into a vertical series of chambers of substantially less height than that portion of said vessel thereabove, the uppermost of said partitions having a plurality of holes therein, said holes being of such size and arrangement across said partition as to provide a substantially uniform aperture cross-sectional area per unit of partition cross-sectional area substantially entirely across said partition, and each of said succeeding partitions having a gradually decreasing number of holes therethrough, said latter holes in each of said succeeding partitions being horizontally staggered between the holes in the partition directly thereabove in such a manner as to receive proportionate flow of solid from said holes thereabove, and a conduit open at its ends dependently associated with each of the holes in at least one of said partitions.

21. In an apparatus for contacting gasiphase reactants with particle-form solid contact mass material and with substantially equal exposure of all portions of the solid material: a substantially cylindrical, vertical vessel adapted to laterally confine a substantially compact column of downwardly moving particle-form solid contact mass material, means to admit gasiphase reactant to said vessel and means to withdraw gasiphase reaction products therefrom, means to introduce said solid material to the upper end of said vessel, a plurality of superposed, transversely extending partitions spaced apart in the lower section of said vessel, said partitions dividing the lower section of said vessel into a series of superimposed chambers of substantially less height than that portion of said vessel thereabove, the uppermost of said partitions having a plurality of substantially equal holes therein arranged in circular rows so spaced apart as to provide a substantially uniform aperture cross-sectional area per unit of partition cross-sectional area substantially entirely across said partition, and each of said succeeding partitions having a progressively decreasing number of circular rows of holes therein, all of the holes in any given partition being substantially equal in cross-sectional area, said rows of holes in said succeeding partitions being horizontally staggered between the rows of holes in the partition thereabove so that each row of holes receives solid flow from two rows of holes in the partition thereabove, a solid material discharge conduit connected to said vessel below the lowermost of said partitions, the inlet thereof being symmetrically placed with regard to said holes in said lowermost partition, flow control means on said conduit to govern the flow rate of solid material through said vessel.

22. Apparatus for the conversion of a reactant in the presence of a moving particle-form solid contact mass material with substantially equal exposure of all points of the contact mass comprising: means defining a vertically disposed reaction zone, means to supply contact mass material thereto, means to introduce reactants thereinto and means to remove reaction products therefrom, a discharge duct of lesser cross-section than said reaction zone disposed therebelow, throttling means on said discharge duct, means defining a connecting zone intermediate said reaction zone and said duct, a plate partition defining the top of said intermediate zone, and a plurality of vertically spaced fixed plate partitions disposed therebelow in parallel relationship therewith, each of said partitions lying within the intermediate zone, a plurality of uniformly spaced concentric circular rows of holes through said first named partition, a progressively decreasing number of spaced concentric rows of holes through said last named spaced partitions below said first named partition, each row of holes in any one of said last named partitions being horizontally staggered between two rows of holes in the partition immediately thereabove.

23. In an apparatus for contacting gasiphase reactants with particle-form solid contact mass material and with substantially equal exposure of all portions of the solid material: a substantially cylindrical, vertical vessel adapted to laterally confine a substantially compact column of downwardly moving particle form solid contact mass material, means to admit gasiphase reactant to said vessel and means to withdraw gasiphase reaction products therefrom, means to introduce said solid material to the upper end of said vessel, a plurality of superposed transversely extending partitions spaced apart in the lower section of said vessel, said partitions dividing the lower section of said vessel into a series of superimposed chambers of substantially less height than that portion of said vessel thereabove, the uppermost of said partitions having a plurality of substantially equal holes therein arranged in concentric circular rows so spaced apart as to provide a substantially uniform aperture cross-sectional area per unit of partition cross-sectional area substantially entirely across said partion, and each succeeding partition having therein half the number of concentric circular rows of holes present in the partition immediately thereabove, the lowermost partition having only one circular row of holes therein, each row of holes in any given partition being staggered between two rows of holes in the partition immediately thereabove in such a way that each row of holes in the succeeding partitions receives proportional solid flow from two rows of holes in the partition immediately thereabove, a plurality of conduits, one dependently associated with each hole in at least one of said partitions, a solid material discharge conduit connected to said vessel below the lowermost of said partitions, the inlet thereof being symmetrically placed with regard to said holes in said lowermost partition, flow control means on said conduit to govern the flow rate of solid material through said vessel.

24. An apparatus for conducting gas-solid contacting operations comprising: a substantially vertical vessel of rectangular cross-sectional shape, means to introduce gas thereinto and means to withdraw gas therefrom, means to introduce particle-form solid material to the upper end thereof, a plurality of superposed, transversely extending partitions spaced apart in the lower section of said vessel, said partitions dividing the lower section of said vessel into a series of superimposed chambers of substantially less height than that portion of said vessel thereabove, the uppermost of said partitions having a plurality of spaced parallel rows of holes therethrough extending horizontally thereacross, said rows of holes being so arranged as to provide substantially uniform aperture cross-sectional area per unit of partitions cross-sectional area substantially entirely across said partition, a progressively decreasing number of spaced rows of holes through said succeeding partitions, said latter rows of holes in any given partition being horizontally staggered substantially midway between rows of holes in the partition immediately thereabove so that each row of holes in any succeeding partition receives solid flow from two rows of holes in the partition thereabove, a conduit having a length at least equal to twice its diameter dependently associated with every hole in at least one of said partitions, a solid material discharge conduit connected to said vessel below the lowermost of said partitions, the inlet thereof being symmetrically placed with regard to said holes in said lowermost partition, flow control means on said conduit to govern the flow rate of solid material through said vessel.

LOUIS P. EVANS.
FREDERICK E. RAY.